United States Patent [19]

Degen et al.

[11] Patent Number: 5,645,956
[45] Date of Patent: Jul. 8, 1997

[54] RESILIENT BATTERY SEPARATOR

[75] Inventors: Peter John Degen, Huntington; Joseph Yuen Lee, South Setauket; Ioannis P. Sipsas, Forest Hills, all of N.Y.

[73] Assignee: Pall Corporation, East Hills, N.Y.

[21] Appl. No.: 508,061

[22] Filed: Jul. 27, 1995

[51] Int. Cl.$^6$ .................................................. H01M 2/16
[52] U.S. Cl. .................................. 429/142; 429/254
[58] Field of Search ............................. 429/142, 254

[56] References Cited

U.S. PATENT DOCUMENTS

| | | |
|---|---|---|
| 3,019,186 | 1/1962 | Powers . |
| 3,246,767 | 4/1966 | Pall et al. . |
| 3,369,057 | 2/1968 | Twilley . |
| 3,616,149 | 10/1971 | Wincklhofer et al. . |
| 4,111,815 | 9/1978 | Walker et al. . |
| 4,186,235 | 1/1980 | Bramwell . |
| 4,196,027 | 4/1980 | Walker et al. . |
| 4,212,733 | 7/1980 | Goto et al. . |
| 4,340,479 | 7/1982 | Pall . |
| 4,360,433 | 11/1982 | Walker et al. . |
| 4,855,108 | 8/1989 | Masuda et al. . |
| 4,935,139 | 6/1990 | Davidson et al. . |
| 4,950,454 | 8/1990 | Masuda et al. . |
| 5,063,108 | 11/1991 | Whetstone . |
| 5,089,122 | 2/1992 | Chmiel . |
| 5,108,827 | 4/1992 | Gessner . |
| 5,401,594 | 3/1995 | Schwobel et al. ............... 429/142 |

FOREIGN PATENT DOCUMENTS 0 064 837   11/1982   European Pat. Off. .

OTHER PUBLICATIONS

Patent Abstracts of Japan, vol. 017, No. 203 (E-1354), 21 Apr. 1993 & JP-A-04 345753 (Kanai Juyo Kogyo Co. Ltd.), 1 Dec. 1996.

Patent Abstracts of Japan, vol. 95, No. 005, & JP-A-07 122256 (Hiroyuki Kanai), 12 May 1995.

"Textile Fibers Hoechst Celanese Corporation: Celbond® Staple Fibers" (Mar. 1991).

*Primary Examiner*—John S. Maples
*Attorney, Agent, or Firm*—Leydig, Voit & Mayer, Ltd.

[57] ABSTRACT

The present invention provides a battery separator comprising a nonwoven web of first and second fibers having a mean diameter of about 15 μm or less, wherein the first fibers comprise at least about 60 wt. % of a first polyolefin having a first melting temperature and no more than about 40 wt. % of a second polyolefin having a second melting temperature which is lower than the first melting temperature, the second fibers comprise a third polyolefin having a third melting temperature which is higher than the second melting temperature, the nonwoven web has two sides, one of which sides has been contacted with a heated surface such that the nonwoven web has been subjected to a temperature higher than the second melting temperature and lower than the first and third melting temperatures so as to render the contacted side more smooth than the other side, the battery separator is spontaneously wettable by an electrolyte, the battery separator has a thickness of at least about 50 μm, and the battery separator has a percent rebound thickness of at least about 92% after the application of pressure up to 80 kPa. The present inventive battery separator preferably comprises two such nonwoven webs mated to each other nonsmooth side-to-nonsmooth side. The present invention also provides a method of preparing such a battery separator, as well as a battery incorporating such a battery separator.

23 Claims, No Drawings

RESILIENT BATTERY SEPARATOR

TECHNICAL FIELD OF THE INVENTION

The present invention pertains to a battery separator and associated method of production, as well as to a battery containing the battery separator.

BACKGROUND OF THE INVENTION

A wide variety of products, from consumer electronics to battery-powered electric vehicles, utilize electrochemical energy sources. Batteries are devices which are capable of converting electrochemical energy into direct current and include a variety of electrochemical systems, such as AgO/Zn, $Ag_2O/Zn$, HgO/Zn, HgO/Cd, Ni/Zn, Ni/Cd, Ni/MH, and Zn/air.

Batteries are made up of one or more battery cells. In its most elementary form, a battery cell comprises a pair of electrodes, namely, an anode and a cathode, a battery separator, and an electrolyte. When a load is applied to the battery, electrons are generated through oxidation at the anode. The electrons thus generated pass through the load, then return to the battery cell at the cathode, where the cathode is reduced.

In such battery cells, the electrolytic solution, i.e., the solution containing the electrolyte, is the medium for mass transport between the electrodes. The primary functions of the battery separator are to prevent physical contact between the electrodes and to retain the electrolytic solution. In a starved-electrolyte battery cell, the separator completely occupies the space between the electrodes, and the electrolytic solution is completely contained within the battery separator. The battery separator thus functions as the reservoir for the electrolytic solution in such cells.

During the discharge and charge cycles of a battery cell, the physical dimensions of the electrodes can change, e.g., as a result of swelling. It is desirable that the separator, particularly in a starved-electrolyte battery cell, be resilient such that it can retain its capacity for electrolytic solution and maintain contact with the electrodes despite such dimensional changes. In addition, the battery separator should be spontaneously, uniformly, and permanently wettable in order to accommodate and fully retain the electrolytic solution, which is typically aqueous, e.g., 20–40 wt. % KOH or NaOH.

The present invention seeks to provide a battery separator which possesses these desirable characteristics. These and other objects and advantages of the present invention, as well as additional inventive features, will be apparent from the description of the invention provided herein.

BRIEF SUMMARY OF THE INVENTION

The present invention provides a battery separator comprising a nonwoven web of first and second fibers having a mean diameter of about 15 μm or less, wherein the first fibers comprise at least about 60 wt. % of a first polyolefin having a first melting temperature and no more than about 40 wt. % of a second polyolefin having a second melting temperature which is lower than the first melting temperature, the second fibers comprise a third polyolefin having a third melting temperature which is higher than the second melting temperature, the nonwoven web has two sides, one of which sides has been contacted with a heated surface such that the nonwoven web has been subjected to a temperature higher than the second melting temperature and lower than the first and third melting temperatures so as to render the contacted side more smooth than the other side, the battery separator is spontaneously wettable by an electrolyte, the battery separator has a thickness of at least about 50 μm, and the battery separator has a percent rebound thickness of at least about 92% after the application of pressure up to 80 kPa. The present inventive battery separator preferably comprises two such nonwoven webs mated to each other nonsmooth side-to-nonsmooth side. The present invention also provides a method of preparing such a battery separator, as well as a battery incorporating such a battery separator.

DESCRIPTION OF THE PREFERRED EMBODIMENTS

The battery separator of the present invention comprises a nonwoven web of first and second fibers having a mean diameter of about 15 μm or less. The battery separator is spontaneously wettable by an electrolyte.

The first fibers comprise at least about 60 wt. % of a first polyolefin having a first melting temperature and no more than about 40 wt. % of a second polyolefin having a second melting temperature which is lower than the first melting temperature. The first fibers preferably comprise at least about 70 wt. %, more preferably at least about 80 wt. % (e.g., about 80–90 wt. %), of the first polyolefin and no more than about 30 wt. %, more preferably no more than about 20 wt. % (e.g., about 10–20 wt. %), of the second polyolefin. The first fibers preferably comprise a core of the first polyolefin and at least a partially surrounding surface coating of the second polyolefin. More preferably, the first fibers comprise a core of the first polyolefin and a sheath of the second polyolefin (i.e., the second polyolefin forms a substantially continuous coating over the surface of the core of the first polyolefin).

The second fibers comprise a third polyolefin having a third melting temperature which is higher than the second melting temperature, i.e., the melting temperature of the second polyolefin of the first fibers. The second fibers can comprise more than one polyolefin, so long as substantially all of the components of the second fibers have melting temperatures above the melting temperature of the second polyolefin of the first fibers. Preferably, the second fibers consist essentially, most preferably exclusively, of the third polyolefin. The third polyolefin can be, and preferably is, the same as the first polyolefin of the first fibers. Thus, the second fibers are preferably prepared from the same polyolefin which makes up the core of the first fibers.

The first and second fibers can be prepared from any suitable polyolefins. Suitable polyolefins include polyethylene, polypropylene, and polymethylpentene. The first and third polyolefins are preferably polypropylene, with the second polyolefin preferably being polyethylene. The fibers of the nonwoven web can be prepared by any suitable means and formed into a nonwoven web by any suitable means, such as the conventional Fourdrinier paper making processes.

The nonwoven web can comprise any suitable relative amounts of the first and second fibers. The nonwoven web preferably comprises about 25–75 wt. % of the first fibers and about 75–25 wt. % of the second fibers. More preferably, the nonwoven web comprises about 40–60 wt. % of the first fibers and about 60–40 wt. % of the second fibers, most preferably 50 wt. % of each of the first and second fibers.

The nonwoven web has two sides and is subjected to a temperature higher than the second melting temperature and lower than the first and third melting temperatures from only one side of the nonwoven web so as to render the side more smooth than the other side. The nonwoven web can be asymmetrically heated by any suitable technique, e.g., by contacting the nonwoven web with a heated surface. The particular temperature of the surface contacting the one side of the nonwoven web, e.g., the heated drum or roll, should be sufficient, in conjunction with the dwell time of the nonwoven web on the heated surface, to raise the temperature of the nonwoven web to a temperature higher than the second melting temperature and lower than the first and third melting temperatures.

As such, the temperature of the heated surface can be greater than the melting temperature of all of the fibers of the nonwoven web so long as the dwell time of the nonwoven web on the heated surface is such that the nonwoven web is not raised to a temperature which causes the significant melting of the first polyolefin of the first fiber or the significant melting of the third polyolefin of the second fiber, which could adversely affect the porosity and void volume of the nonwoven web. For example, as regards a nonwoven web comprising a first fiber of polypropylene with a sheath of polyethylene and a second fiber of only polypropylene, the nonwoven web can be passed at a rate of about 75 m/min over a steel drum or roll having a contact length of about 45 cm which is maintained at a temperature of about 200°–220° C. While it is conceivable that the nonwoven web could be so heat-treated after any surface modification of the nonwoven web to render it spontaneously wettable by an electrolyte, e.g., the graft polymerization of a suitable monomer onto the surface of the nonwoven web, the nonwoven web will be generally heat-treated prior to any such surface modification.

Such heating of the nonwoven web causes the second polyolefin of the first fiber to soften and/or flow so as to effect bonding among the first and second fibers substantially throughout the nonwoven web. The heating of the nonwoven web should be sufficient to not only effect a smoothing of the nonwoven web surface contacting the heated surface, but also to provide the nonwoven web with the desired handling characteristics, e.g., tensile properties, while not adversely affecting the void volume, e.g., electrolyte capacity, and resiliency of the nonwoven web.

In particular, the fibers on the side which is rendered smoother ("the smooth side") are fused together to a greater extent than the fibers in the remainder of the nonwoven web, which substantially retains its original degree of resiliency. Similarly, the side which is not rendered smoother ("the nonsmooth side"), unlike the smooth side, has fibers protruding from the surface of the nonwoven web. Thus, for example, the application of conventional adhesive tape to the nonsmooth side results in the removal of some fibers from the nonwoven web surface when the adhesive tape is pulled from that side, whereas no significant fiber removal results when the same "tape test" is applied to the smooth side.

The fibers used to form the nonwoven web have a mean diameter of about 15 µm or less. Preferably, substantially all of the fibers forming the nonwoven web have a diameter of about 15 µm or less. The fibers forming the nonwoven web will typically have a mean diameter of about 2–12 µm, more typically about 4–12 µm, and most typically about 8–12 µm. The fibers can have any suitable length, preferably up to about 10 mm.

In many battery applications, it is desirable that the battery separator be relatively smooth on both sides while retaining excellent resiliency. Thus, preferably two of the aforesaid nonwoven webs are mated together nonsmooth side-to-nonsmooth side such that the smooth sides face outward. When two of the aforesaid nonwoven webs are so mated together, the respective nonwoven webs are preferably mated together prior to any surface modification, although, if desired, the mating of the two nonwoven webs can take place after any surface modification thereof. In use within a battery, the smooth sides of such a battery separator will contact the electrodes within the battery.

The nonwoven web can be rendered spontaneously wettable by an electrolyte in any suitable manner, e.g., by surface modifying the nonwoven web in any suitable manner to render it spontaneously wettable by an electrolyte, preferably an alkaline electrolyte, e.g., about 20–40 wt. % aqueous KOH, more typically about 30–35 wt. % aqueous KOH, and especially about 30 wt. % KOH. The nonwoven web will be typically so surface modified by graft polymerizing a suitable monomer in any suitable manner onto the nonwoven web. Preferably, the nonwoven web will be modified to have a critical wetting surface tension (CWST) of at least about 70 mN/m as determined by the CWST test disclosed in U.S. Pat. No. 4,880,548. More preferably, the nonwoven web has a critical wetting surface tension of at least about 78 mN/m, and, most preferably, the nonwoven web is characterized by a drop of a fluid having a critical wetting surface tension of about 83 mN/m contacting the surface of said nonwoven web being absorbed into said nonwoven web in less than about 30 sec.

The monomer preferably is selected from the group consisting of vinyl sulfonic acid, vinyl phosphonic acid, and acrylic and methacrylic acid monomers and hydroxyl functional derivatives thereof. More preferably, the monomer is selected from the group consisting of acrylic acid, methacrylic acid, hydroxyethylacrylate, hydroxyethylmethacrylate, hydroxypropylacrylate, hydroxypropylmethacrylate, and combinations thereof, particularly methacrylic acid and hydroxyethylmethacrylate.

While any suitable means can be used to graft polymerize the monomer onto the hydrophobic fibers employed in the present invention, radiation grafting is the preferred technique to achieve the desired result. The source of the radiation can be from radioactive isotopes such as cobalt 60, strontium 90, or cesium 137. Alternatively, the radiation may come from sources such as X-ray machines, electron accelerators, ultraviolet generators, and the like. Electron beam (E-beam) radiation is the preferred source of radiation.

Grafting will typically be accomplished by either irradiating the nonwoven web and then exposing it to a suitable solution of monomer, or, alternatively, by irradiating the nonwoven web while it is contacted with a solution of the monomer. If the polymerization is effected by the former method, the nonwoven web should contact the monomer solution as quickly as possible in order to minimize any side-reactions that will deplete the active sites generated by the radiation. In either case, the radiation should be conducted in the substantial absence of oxygen, which reduces the effectiveness of the process. Preferably, irradiation is performed under inerting by nitrogen or other noble gas(es).

The battery separator, specifically the nonwoven web and any surface coating thereon, should be chemically resistant to the electrolyte, particularly alkaline electrolytes with which the battery separator is particularly well-suited. Moreover, the battery separator should retain its characteristic of being spontaneously wettable by an electrolyte after exposure to such an electrolyte for a significant period of time, e.g., during the course of multiple charge and recharge cycles of a battery incorporating such a battery separator.

After completion, the battery separator should be readily and uniformly wettable in a consistent manner, which allows for the efficient and complete introduction of electrolyte during battery manufacture. A practical measure of the wettability of a battery separator is the wicking rate of the battery separator, e.g., the relative time for a battery separator to vertically wick an electrolyte a given distance. The present inventive battery separator preferably is able to vertically wick 30 wt. % aqueous KOH to a distance of 1 inch (2.54 cm) in less than about 300 seconds, more preferably less than about 200 seconds, and most preferably less than about 150 seconds.

The battery separator can have any suitable thickness, generally a thickness of at least about 50 µm. The battery separator is preferably as thin as possible, e.g., sufficient to provide the desired strength and uniformity. Further, the battery separator should be of sufficient thickness to provide the needed physical and electrical separation between battery electrodes and the desired electrolyte capacity, e.g., at least about 200 wt. % adsorption capacity, preferably at least about 300 wt. % adsorption capacity, of an electrolyte solution, particularly an alkaline electrolyte solution such as about 30 wt. % aqueous KOH. The battery separator preferably has a thickness of less than about 1000 µm, more preferably less than about 500 µm, and most preferably about 150 to about 500 µm.

The battery separator should be as uniform as possible as regards thickness. Preferably, the battery separator will have a thickness variability of no more than about ±10%, more preferably no more than about ±9%, which represents about 3 standard deviations of the mean thickness of the battery separator. Most preferably, the battery separator will have a thickness variability of no more than about ±5%.

The battery separator can have any suitable basis (or sheet) weight. The battery separator preferably has a basis weight of at least about 10 g/m$^2$, e.g., about 10–120 g/m$^2$, more preferably greater than about 20 g/m$^2$, e.g., about 20–100 g/m$^2$. The battery separator will typically have a sheet weight of about 40–80 g/m$^2$, most typically about 40–60 g/m$^2$, especially for metal hydride batteries, particularly Ni/MH batteries.

The battery separator has an excellent resiliency. In particular, the battery separator is capable of rebounding to nearly its original thickness after the application of significant amounts of pressure to temporarily compress the battery separator. Thus, in normal use within a battery between electrodes which swell and contract during charge and discharge cycles, the battery separator maintains intimate contact with the electrodes and retains its capacity for the electrolyte solution.

The battery separator preferably has a percent rebound thickness of at least about 92% after the application of pressure up to 80 kPa. In other words, the battery separator is capable of rebounding to at least about 92% of its original thickness after the application and removal of pressure up to 80 kPa. More preferably, the battery separator has a percent rebound thickness of at least about 95%, most preferably at least about 97%, or even at least about 98%, after the application of pressure up to 80 kPa.

In addition, the battery separator preferably exhibits a rebound thickness versus pressure slope of about 0 to about −0.2 µm/kPa, more preferably about 0 to about −0.15 µm/kPa, and most preferably about 0 to about −0.1 µm/kPa, with the application of pressure up to 80 kPa. Similarly, the battery separator preferably exhibits a percent rebound thickness versus pressure slope of about 0 to about −0.1% rebound thickness/kPa, more preferably about 0 to about −0.07% rebound thickness/kPa, and most preferably about 0 to about −0.05% rebound thickness/kPa, with the application of pressure up to 80 kPa.

The percent rebound thickness is determined using the following test procedure. The "as is" thickness of a test sample of the battery separator, i.e., of the nonwoven web after grafting, washing, and drying, is determined using a hand-held Federal Gauge Model 22P-10. The battery separator is placed on a flat, solid surface, and a 3.81 cm ×3.81 cm×0.48 cm stainless steel plate with loaded weights is placed on top of the battery separator so as to compress the battery separator with applied pressures of up to at least 80 kPa, generally increased in about 10–20 kPa increments. Once loaded, the pressure is maintained on the battery separator for about 3 minutes. The load is then removed from the battery separator. After allowing the battery separator to rebound for about one minute, the thickness of the battery separator is measured in five places, namely in each of the four corners and the center of the area contacted by the stainless steel plate. The percent rebound thickness, i.e., the rebounded thickness divided by the original thickness multiplied by 100%, is then calculated.

The battery separator can have any suitable tensile properties. Generally, the battery separator will have a tensile strength in both the machine direction (MD) and the cross-machine direction (CMD) of at least about 500 N/m, more typically at least about 800 N/m, and most typically at least about 1000 N/m. Preferably, the battery separator will have a MD tensile strength of at least 1500 N/m and a CMD tensile strength of at least about 1000 N/m. More preferably, the battery separator will have a MD tensile strength of at least about 2000 N/m and a CMD tensile strength of at least about 1500 N/m. All of the tensile properties discussed herein are as measured using an Instron® table model tester in accordance with ASTM D-1117.

The battery separator can have any suitable electrical properties. In particular, the battery separator preferably has as low an electrical resistance as possible, e.g., about 150 mohm-cm$^2$ or less. Typically the battery separator will have an electrical resistance of about 25–100 mohm-cm$^2$, most typically about 50–100 mohm-cm$^2$.

The present invention also encompasses a method of making a battery separator as described herein. The method comprises (a) preparing a nonwoven web of fibers having a mean diameter of about 15 µm or less and a thickness of at least about 50 µm, wherein the nonwoven web comprises (i) first fibers comprising at least about 60 wt. % of a first polyolefin having a first melting temperature and no more than about 40 wt. % of a second polyolefin having a second melting temperature which is lower than the first melting temperature and (ii) second fibers comprising a third polyolefin having a third melting temperature which is higher than the second melting temperature, (b) contacting one of the two sides of the nonwoven web with a heated surface such that the nonwoven web is subjected to a temperature higher than the second melting temperature and lower than the first and third melting temperatures so as to render the contacted side more smooth than the other side, and (c) surface modifying the nonwoven web, e.g., graft polymerizing a monomer on the surface of the nonwoven web, so as to render the nonwoven web spontaneously wettable by an electrolyte, preferably an alkaline electrolyte, e.g., about 20–40 wt. % aqueous KOH, more typically about 30–35 wt. % aqueous KOH, and especially about 30 wt. % KOH, wherein the battery separator has a percent rebound thickness of at least about 92% after the application of pressure up to 80 kPa. The present inventive method further comprises mating two of such nonwoven webs, preferably prior to the surface modification thereof, nonsmooth side-to-nonsmooth side to form a battery separator with the smooth sides facing outward which are intended to intimately contact the electrodes within a battery. The various aspects of the present inventive method, such as the preferred characteristics of the nonwoven web, preferred monomer for graft polymerization, and the like, have been discussed above with respect to the present inventive battery separator.

The present invention further provides for a novel battery, as well as a method of preparing such a battery. In particular, the present invention provides a battery, especially an alkaline battery and particularly a rechargeable and/or starved-electrolyte battery, wherein the improvement comprises the inclusion of the battery separator of the present invention to separate one or more pairs of electrodes within the battery. The present inventive battery separator can be used with any suitable electrodes, such as the Ovonic Battery Company base alloy electrodes disclosed in U.S. Pat. No. 5,330,861, or Misch-metal electrodes, which are particularly useful in metal hydride batteries, especially Ni/MH batteries.

Similarly, the present invention provides a method of preparing a battery, particularly a rechargeable and/or starved-electrolyte battery, wherein the improvement comprises the inclusion within such a battery of the battery separator of the present invention. The battery separator of the present invention can be incorporated into a battery using any suitable manufacturing process. A wide variety of primary and secondary batteries fall within the purview of the present invention, for example, HgO/Cd, Ni/Zn, Ni/Cd, Ni/MH, and Zn/air electrochemical systems. These batteries may be made by, for example, arranging a number of battery cells in series, wherein at least one of the cells contains a battery separator of the present invention.

The following example further illustrates the present invention but, of course, should not be construed as in any way limiting its scope.

EXAMPLE

This example illustrates the preparation of the present inventive battery separator and compares its properties with those of a conventional battery separator.

A nonwoven web was prepared using the conventional Fourdrinier paper making process from a 50/50 wt/wt mixture of first fibers of a polypropylene core and surrounding polyethylene sheath such that the fibers were about 80 wt. % polypropylene and about 20 wt. % polyethylene, and second fibers of pure polypropylene. Both the first and second fibers had mean diameters of about 5–10 µm. The nonwoven web was formed at about 60 g/m and then was passed over a heated drum to asymmetrically heat the nonwoven web so as to render the side of the nonwoven web contacting the heated drum smooth and highly bonded, while leaving the other, noncontacted side relatively loose and springy. The nonwoven web was subjected under an inert atmosphere to 2 Mrad E-beam radiation in a single pass while the nonwoven web moved through the E-beam at the rate of 610 cm/min. The nonwoven web was then subjected to a grafting solution comprising 3 wt. % methacrylic acid, 24 wt. % t-butanol, and 73 wt. % water. The thus grafted nonwoven web was water washed and then dried. The properties of the resulting battery separator are set forth in Table 1.

TABLE 1

| Property | Value |
| --- | --- |
| Basis Weight (g/m$^2$) | 59 +/− 1.31 |
| Thickness (µm) | 230 +/− 10 |
| Tensile Strength (MD) (N/m) | 2100 |
| Tensile Strength (CMD) (N/m) | 1480 |
| Electrical Resistance (mohm-dm$^2$) | 0.55 |
| Time Required to Wick 30 wt. % aqueous KOH a Distance of 2.54 cm (sec) | 83 |
| Absorption Capacity of 30 wt. % aqueous KOH (wt. %) | 412 |
| Critical Wetting Surface Tension (mN/m) | 83 |
|  | <30 sec |

The percent rebound thickness of the resulting battery separator was evaluated and compared with the percent rebound thickness of a conventional nylon battery separator available under the trademark VILEDON from Freudenberg Nonwovens Group, Weinheim, Germany (and also available under the trademark WEBRIL from Veratec, Inc., Athens, Ga.). The rebound thicknesses (in µm and %) of the two battery separators as a function of applied pressure (kPa) are set forth in Table 2.

TABLE 2

| Present Inventive Battery Separator | | | Conventional Nylon Battery Separator | | |
| --- | --- | --- | --- | --- | --- |
| Pressure | Rebound Thickness | | Pressure | Rebound Thickness | |
| (kPa) | (µm) | [%] | (kPa) | (µm) | [%] |
| 0.0 | 206 | (100%) | 0.0 | 262 | (100%) |
| 31.0 | 203 | (99%) | 15.9 | 255 | (97%) |
| 52.4 | 202 | (98%) | 31.0 | 246 | (94%) |
| 66.9 | 202 | (98%) | 61.4 | 243 | (93%) |
| 82.7 | 201 | (98%) | 71.0 | 238 | (91%) |
| 96.5 | 200 | (97%) | 83.4 | 236 | (90%) |

As demonstrated by the rebound thickness test results, the present inventive battery separator has an excellent resiliency as compared to the conventional nylon battery separator. In particular, while the conventional nylon battery separator was capable of only about 90% rebound at an applied pressure of about 80 kPa, the present inventive battery separator was capable of 97% rebound at an applied pressure up to about 80 kPa and even up to about 100 kPa.

In addition, a plot of rebound thickness versus applied pressure reveals that the slope of the resulting curves (straight lines) are dramatically different for the present inventive and conventional nylon battery separators. While there is a significant decrease in rebound thickness with increasing applied pressure for the conventional nylon battery separator (i.e., a slope of about −0.3 µm/kPa), there is little change in rebound thickness with increasing applied pressure for the present inventive battery separator (i.e., a slope of about −0.06 µm/kPa, or about a five times smaller slope than the slope for the conventional nylon battery separator).

Similarly, a plot of percent rebound thickness versus applied pressure also reveals that the slope of the resulting curves (straight lines) are dramatically different for the present inventive and conventional nylon battery separators. While there is a significant decrease in percent rebound thickness with increasing applied pressure for the conventional nylon battery separator (i.e., a slope of about −0.12% rebound thickness/kPa), there is much less a change in percent rebound thickness with increasing applied pressure for the present inventive battery separator (i.e., a slope of about −0.03% rebound thickness/kPa, or about a four times smaller slope than the slope for the conventional nylon battery separator).

All of the references cited herein are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A battery separator comprising a nonwoven web of first and second fibers having a mean diameter of about 15 μm or less, wherein said first fibers comprise at least about 60 wt. % of a first polyolefin having a first melting temperature and no more than about 40 wt. % of a second polyolefin having a second melting temperature which is lower than said first melting temperature, said second fibers comprise a third polyolefin having a third melting temperature which is higher than said second melting temperature, said nonwoven web has two sides, one of which sides has been contacted with a heated surface such that said nonwoven web has been subjected to a temperature higher than the second melting temperature and lower than the first and third melting temperatures so as to render said contacted side more smooth than the other side, said battery separator is spontaneously wettable by an electrolyte, said battery separator has a thickness of at least about 50 μm, and said battery separator has a percent rebound thickness of at least about 92% after the application of pressure up to 80 kPa.

2. The battery separator of claim 1, wherein said battery separator further comprises another of said nonwoven webs such that the two nonwoven webs are mated to each other nonsmooth side-to-nonsmooth side.

3. The battery separator of claim 2, wherein said battery separator further comprises a graft polymerized monomer on the surface of said nonwoven web which renders said nonwoven web spontaneously wettable by an alkaline electrolyte.

4. The battery separator of claim 3, wherein said nonwoven web has a percent rebound thickness of at least about 95% after the application of pressure up to 80 kPa.

5. The battery separator of claim 4, wherein said first and third polyolefins are the same.

6. The battery separator of claim 5, wherein said nonwoven web comprises about 25–75 wt. % of said first fibers and 75–25 wt. % of said second fibers.

7. The battery separator of claim 6, wherein said battery separator has a thickness of about 150–500 μm.

8. The battery separator of claim 7, wherein said alkaline electrolyte is about 20–40 wt. % aqueous KOH.

9. The battery separator of claim 8, wherein said first and second fibers have a mean diameter of about 2–12 μm.

10. The battery separator of claim 9, wherein said first and third polyolefins are polypropylene and said second polyolefin is polyethylene.

11. The battery separator of claim 10, wherein said nonwoven web comprises at least about 80 wt. % of said first polyolefin and no more than about 20 wt. % of said second polyolefin.

12. The battery separator of claim 11, wherein said fibers comprise a core of said first polyolefin and at least a partially surrounding surface coating of said second polyolefin.

13. The battery separator of claim 12, wherein said fibers comprise a core of said first polyolefin and a sheath of said second polyolefin.

14. The battery separator of claim 13, wherein said nonwoven web has a critical wetting surface tension of at least about 70 mN/m.

15. A rechargeable, starved-electrolyte battery comprising two electrodes separated by the battery separator of claim 1.

16. A rechargeable, starved-electrolyte battery comprising two electrodes separated by the battery separator of claim 2.

17. A rechargeable, starved-electrolyte battery comprising two electrodes separated by the battery separator of claim 3.

18. A battery separator comprising a nonwoven web of first and second fibers having a mean diameter of about 15 μm or less, wherein said first fibers comprise at least about 60 wt. % of a first polyolefin having a first melting temperature and no more than about 40 wt. % of a second polyolefin having a second melting temperature which is lower than said first melting temperature, said second fibers comprise a third polyolefin having a third melting temperature which is higher than said second melting temperature, said nonwoven web has two sides, one of which sides has been contacted with a heated surface such that said nonwoven web has been subjected to a temperature higher than the second melting temperature and lower than the first and third melting temperatures so as to render said contacted side more smooth than the other side, said battery separator is spontaneously wettable by an electrolyte, said battery separator has a thickness of at least about 50 μm, and said battery separator has a percent rebound thickness versus pressure slope of about 0 to about −0.1% rebound thickness/kPa with the application of pressure up to 80 kPa.

19. The battery separator of claim 18, wherein said battery separator further comprises two of said nonwoven webs mated to each other nonsmooth side-to-nonsmooth side.

20. The battery separator of claim 19, wherein said battery separator further comprises a graft polymerized monomer on the surface of said nonwoven web which renders said nonwoven web spontaneously wettable by an alkaline electrolyte.

21. A rechargeable, starved-electrolyte battery comprising two electrodes separated by the battery separator of claim 18.

22. A rechargeable, starved-electrolyte battery comprising two electrodes separated by the battery separator of claim 19.

23. A rechargeable, starved-electrolyte battery comprising two electrodes separated by the battery separator of claim 20.

* * * * *